US008625025B2

(12) United States Patent
Lee

(10) Patent No.: US 8,625,025 B2
(45) Date of Patent: Jan. 7, 2014

(54) APPARATUS AND METHOD FOR DETECTING FLEXIBLE VIDEO CADENCE

(75) Inventor: Tung-Hsin Lee, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 47 days.

(21) Appl. No.: 13/114,058

(22) Filed: May 24, 2011

(65) Prior Publication Data
US 2012/0212666 A1    Aug. 23, 2012

(30) Foreign Application Priority Data

Feb. 18, 2011   (TW) .............................. 100105493 A

(51) Int. Cl.
*H04N 11/20* (2006.01)
*H04N 5/46* (2006.01)
*H04N 5/14* (2006.01)
*H04N 9/64* (2006.01)

(52) U.S. Cl.
USPC ............ 348/452; 348/441; 348/558; 348/700

(58) Field of Classification Search
USPC .................. 348/48–449, 452, 458, 459, 558, 348/700–701
See application file for complete search history.

(56) References Cited

U.S. PATENT DOCUMENTS

| 5,563,651 | A  | * | 10/1996 | Christopher et al. | ............ 348/97 |
| 5,828,786 | A  | * | 10/1998 | Rao et al. | ............ 382/236 |
| 6,201,577 | B1 | * | 3/2001  | Swartz | ............ 348/558 |
| 6,525,774 | B1 | * | 2/2003  | Sugihara | ............ 348/459 |
| 6,542,199 | B1 | * | 4/2003  | Manbeck et al. | ............ 348/459 |
| 6,563,550 | B1 | * | 5/2003  | Kahn et al. | ............ 348/700 |
| 6,704,055 | B1 | * | 3/2004  | He et al. | ............ 348/449 |
| 6,867,814 | B2 | * | 3/2005  | Adams et al. | ............ 348/448 |
| 7,039,111 | B2 | * | 5/2006  | Lee | ............ 375/240.16 |
| 7,075,581 | B1 | * | 7/2006  | Ozgen et al. | ............ 348/448 |
| 7,116,828 | B2 | * | 10/2006 | Wells | ............ 382/233 |
| 7,129,990 | B2 | * | 10/2006 | Wredenhagen et al. | ............ 348/449 |
| 7,154,555 | B2 | * | 12/2006 | Conklin | ............ 348/448 |
| 7,212,246 | B2 | * | 5/2007  | Jung et al | ............ 348/448 |
| 7,233,361 | B2 | * | 6/2007  | Yang et al. | ............ 348/441 |
| 7,349,029 | B1 | * | 3/2008  | Chou | ............ 348/448 |
| 7,446,818 | B2 | * | 11/2008 | Chao | ............ 348/558 |
| 7,489,350 | B2 | * | 2/2009  | De Haan et al. | ............ 348/252 |
| 7,605,866 | B2 | * | 10/2009 | Conklin | ............ 348/448 |
| 7,705,914 | B2 | * | 4/2010  | Yamauchi | ............ 348/448 |
| 7,738,037 | B2 | * | 6/2010  | Tang et al. | ............ 348/441 |
| 7,800,692 | B2 | * | 9/2010  | Wredenhagen et al. | ............ 348/449 |
| 7,898,598 | B2 | * | 3/2011  | Chen et al. | ............ 348/558 |
| 8,004,607 | B2 | * | 8/2011  | Eymard et al. | ............ 348/452 |

(Continued)

*Primary Examiner* — Brian Yenke
(74) *Attorney, Agent, or Firm* — Jianq Chyun IP Office

(57) ABSTRACT

A flexible video cadence detecting apparatus includes a motion detecting unit, a cycle detecting unit, a film detecting unit, and a de-interlacing unit. The motion detecting unit receives a plurality of continuous field images and determines whether or not there is motion in each field image. The motion detecting unit assigns a first or a second value according to whether or not there is motion in the field image, so as to obtain a value stream. The cycle detecting unit receives the value stream and detects whether or not the first or the second value has a cycle, so as to output a cycle determinant. The film detecting unit receives the value stream and the cycle determinant and determines whether or not the field images are a film, to output a cadence pattern. The de-interlacing unit restores the field images into an original film according to the cadence pattern.

20 Claims, 4 Drawing Sheets

(56) References Cited

U.S. PATENT DOCUMENTS

| | | | |
|---|---|---|---|
| 8,120,703 B2* | 2/2012 | Adams | 348/448 |
| 2002/0057368 A1* | 5/2002 | Fakhruddin | 348/558 |
| 2003/0098924 A1* | 5/2003 | Adams et al. | 348/448 |
| 2004/0135924 A1* | 7/2004 | Conklin | 348/448 |
| 2007/0002169 A1* | 1/2007 | Munsil et al. | 348/446 |
| 2007/0052846 A1* | 3/2007 | Adams | 348/452 |
| 2007/0188662 A1* | 8/2007 | Winger et al. | 348/701 |
| 2008/0062308 A1* | 3/2008 | Zhai et al. | 348/448 |
| 2008/0158414 A1* | 7/2008 | Capps | 348/448 |
| 2008/0252721 A1* | 10/2008 | Suzuki | 348/97 |
| 2010/0253838 A1* | 10/2010 | Garg et al. | 348/452 |
| 2012/0162507 A1* | 6/2012 | Shin et al. | 348/446 |

\* cited by examiner

APPARATUS AND METHOD FOR DETECTING FLEXIBLE VIDEO CADENCE

CROSS-REFERENCE TO RELATED APPLICATION

This application claims the priority benefit of Taiwan application serial no. 100105493, filed on Feb. 18, 2011. The entirety of the above-mentioned patent application is hereby incorporated by reference herein and made a part of this specification.

BACKGROUND OF THE INVENTION

1. Field of the Invention

The present invention generally relates to a video cadence detecting technique, and more particularly, to a flexible video cadence detecting technique.

2. Description of Related Art

The shooting speed of a film is usually different from the play speed thereof. The film shooting speed may be 24 Hz, while the general play speed may be 60 Hz in the NTSC standard and 50 Hz in the PAL&SECAM standard. Thus, a film is pulled down to the desired play standard in order to be played in the NTSC standard or the PAL&SECAM standard.

For example, when the play speed of a film is to be changed from 24 Hz to 50 Hz in the PAL standard, each image is split into an even image and an odd image. As generally known, an even image is composed of pixels taken from even-numbered scan lines in an original image, and an odd image is composed of pixels taken from odd-numbered scan lines in an original image. By splitting an image into an even image and an odd image, the play speed can be changed from 24 Hz into about 50 Hz. In other words, original images are split according to the speed required by the play standard and a selected video cadence and played in an interlaced manner.

Contrarily, if field images are to be restored into original images, the video cadence of the field images needs to be detected so that the field images can be restored into the original images according to the video cadence.

FIG. 1 is a system block diagram illustrating how conventionally field images are restored into an original film. Referring to FIG. 1, the motion detecting unit 100 determines whether or not there is motion in a current field image by referring to a previous field image and a next field image. For example, if the current field image and the next field image are respectively an even image and an odd image from the same original image, the motion detecting unit 100 determines that there is no motion in the current field image. If the current field image and the next field image are respectively an even image and an odd image from different original images, the motion detecting unit 100 determines that there is no motion in the current field image. In other words, whether or not there is motion in each field image is determined to obtain a pattern.

The cadence pattern recognizing unit 102 compares the pattern detected by the motion detecting unit 100 with data in the cadence database 104 to obtain a corresponding cadence pattern. Finally, the de-interlacing unit 106 restores each original image (also referred as a frame) according to the cadence pattern.

In the conventional technique described above, the cadence database 104 is disposed for storing different cadence patterns, so as to correctly restore field images into an original film. Besides, the system cannot work properly if more cadence patterns are used and these cadence patterns are not stored in the cadence database 104.

SUMMARY OF THE INVENTION

Accordingly, the invention is directed to an apparatus and a method for detecting a flexible video cadence, wherein the cadence pattern of a film can be detected without being limited to a fixed number of cadence patterns.

According to an embodiment of the invention, a flexible video cadence detecting apparatus including a motion detecting unit, a cycle detecting unit, a film detecting unit, and a de-interlacing unit is provided. The motion detecting unit receives a plurality of continuous field images and determines whether or not there is motion in each of the field images. The motion detecting unit assigns a first value if there is no motion in a field image and assigns a second value if there is motion in the field image, so as to obtain a value stream. The cycle detecting unit receives the value stream and detects whether or not the first value or the second value has a cycle, so as to output a cycle determinant. The film detecting unit receives the value stream and the cycle determinant and determines whether or not the received field images are in a film format, so as to output a cadence pattern. The de-interlacing unit restores the field images into an original film according to the cadence pattern output by the film detecting unit.

According to an embodiment of the invention, a film and interlacing cadence detecting apparatus including a motion detecting unit, a cycle detecting unit, and a film detecting unit is provided. The motion detecting unit receives a plurality of continuous field images and determines whether or not there is motion in each of the field images. The motion detecting unit assigns a first value if there is no motion in a field image and assigns a second value if there is motion in the field image, so as to obtain a value stream. The cycle detecting unit receives the value stream, detects whether or not the first value or the second value has a cycle, and outputs the cycle. The film detecting unit receives the value stream, determines whether or not the field images are in a film format according to the cycle, and determines an interlacing cadence according to variations of the first value and the second value in the cycle.

According to an embodiment of the invention, a film and interlacing cadence detecting method adapted to detect a plurality of field images continuously input to a detecting apparatus is provided. The present method includes determining whether or not there is motion in each of the field images, wherein a first value is assigned if there is no motion in the field image, and a second value is assigned if there is motion in the field image, so that a value stream is obtained. The present method also includes detecting whether or not the first value or the second value has a cycle in the value stream, determining whether or not the field images are in a film format according to the value stream, and determining an interlacing cadence according to variations of the first value and the second value in the cycle.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
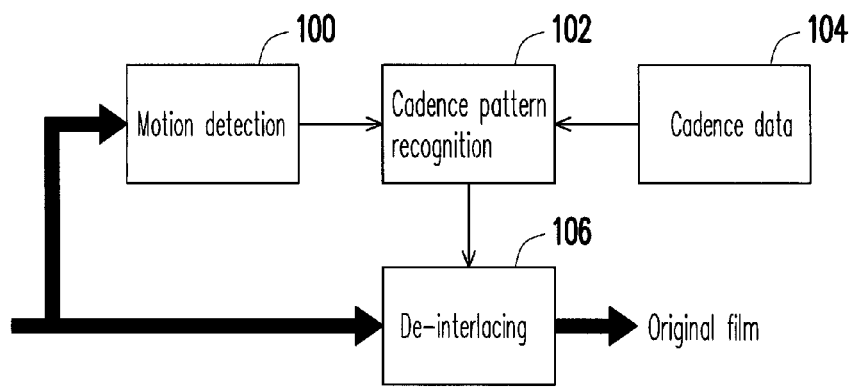
FIG. 1 is a system block diagram illustrating how conventionally field images are restored into an original film.

Reference will now be made in detail to the present preferred embodiments of the invention, examples of which are illustrated in the accompanying drawings. Wherever possible, the same reference numbers are used in the drawings and the description to refer to the same or like parts.

According to the invention, a cadence pattern is directly detected from a plurality of field images without being limited to a fixed number of cadence patterns so that the field images can be restored into an original film according to any different cadence pattern. Below, embodiments of the invention will be described but not intended to limit the scope of the invention. In addition, techniques described in following embodiments may be appropriately integrated.

The mechanism for detecting whether or not there is motion in each field image will be described herein.

Herein it is assumed that a film is split based on the ratio of 3:2. Namely, a previous image is split into three field images, and the image that follows is split into two field images. A pattern 10100 in the sequence from a closest field image to a farthest field image is obtained through the operation of a motion detecting unit, wherein 1 represents that there is motion in a field image and 0 represents that there is no motion in the field image.

Figure 2:
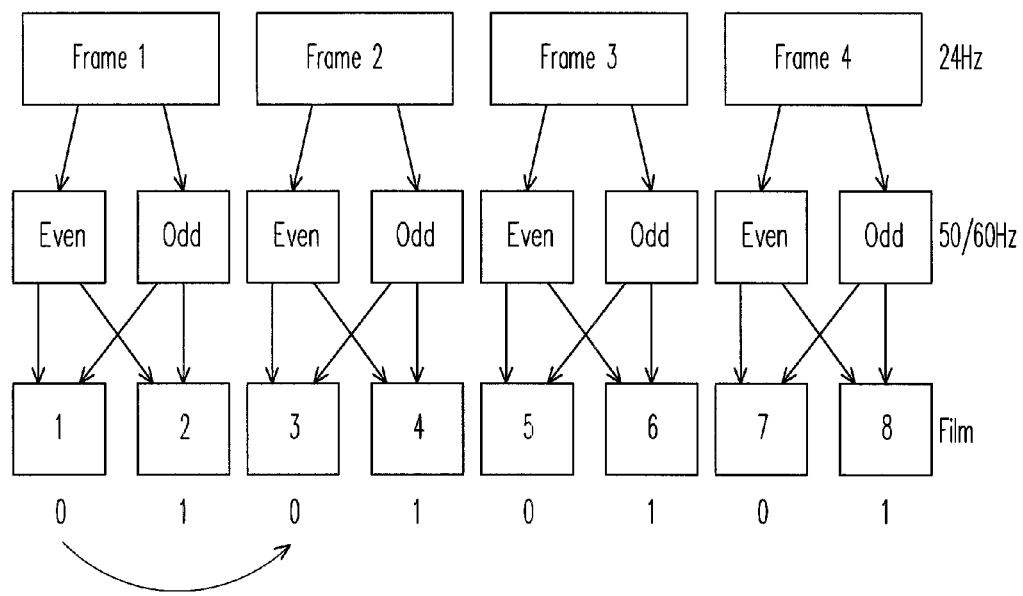
FIG. 2 is a diagram illustrating a 2:2 splitting mechanism according to an embodiment.

FIG. 2 is a diagram illustrating a 2:2 splitting mechanism according to an embodiment. Referring to FIG. 2, it is assumed that the film is shot in unit of frame and the shooting speed is in unit of Hz. In the present embodiment, four frames (for example, frames 1-4) are taken as examples. In the present embodiment, the 2:2 splitting mechanism is adopted and each frame is split into field images (an even image and an odd image of 50/60 Hz). In the present embodiment, the film is played by starting from an even image or an odd image. After each frame is split into an even image and an odd image, the even images and odd images are composed into field images according to a play standard to be played (for example, in a TV). The field images composed from the frames 1-4 may be field images 1-8. Taking the frame 1 as an example, because field image 1 and field image 2 are from the same frame 1 and are woven by using an even image and an odd image, no motion is detected when field image 2 is compared with field image 1 and accordingly field image is marked as 0. Next, when field image 3 is compared with field image 2, a motion is detected. This is because that field image 2 is an image of the frame 1, while field image 3 is an image of frame 2. field image 2 is marked as 1 unless these images are static.

Analogic to what have been mentioned above, the other field images 3-8 have the same recurrent pattern. Accordingly, a specific cadence pattern (which is 01010101 in the present embodiment) is determined. Because each field image has only one state (i.e., 0 or 1), the binary value can be indicated by using one bit. Accordingly, a value stream is obtained. Herein the binary values 0 and 1 are adopted. However, generally speaking, foregoing two states may also be indicated by using other different values. In other words, one value is used for indicating the situation of no motion while another value is used for indicating the situation of motion.

In the embodiment illustrated in FIG. 2, the first bit has a value 0, and the value 0 appears every other bit, as indicated by the arrows.

Figure 3:
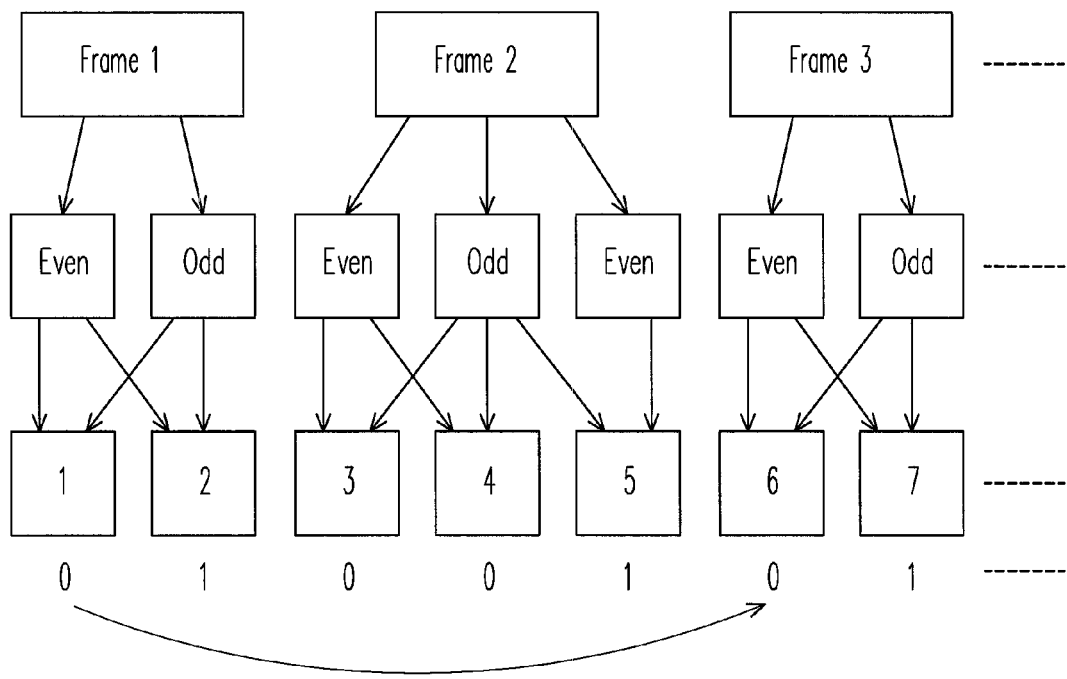
FIG. 3 is a diagram illustrating a 2:3 splitting mechanism according to an embodiment.

FIG. 3 is a diagram illustrating a 2:3 splitting mechanism according to an embodiment. Referring to FIG. 3, because the 2:3 splitting mechanism is adopted, the frame 2 is split into three images. Based on the same mechanism illustrated in FIG. 2, there is motion in the field image of the adjacent new frame and accordingly the field image is marked as 1. In the present embodiment, the cadence pattern is the recurrence of 01001.

Figure 4:
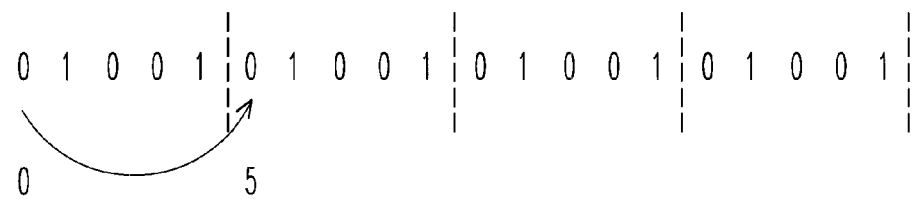
FIG. 4 is a diagram illustrating the relationship between a value stream in FIG. 3 and a cadence pattern.

FIG. 4 is a diagram illustrating the relationship between the value stream in FIG. 3 and a cadence pattern. A value stream having 20 bits is analyzed herein. If the detection cycle is 5, the value of the first bit from the left is taken for detection and which is expected to re-appear after every four bits. If the detection cycle is not 5, the value 0 does not appear recurrently, which means the value stream does not have a correct cycle.

In addition, if each value 1 comes with a value 0 before and after it, it is determined that different frames are played (i.e., dynamic play of the film). If each value 1 comes with a value 0 before and after it and there is a fixed cycle, it is determined that a film is played and the frames can be restored into original film frames according to the cadence pattern of the cycle.

Figure 5:
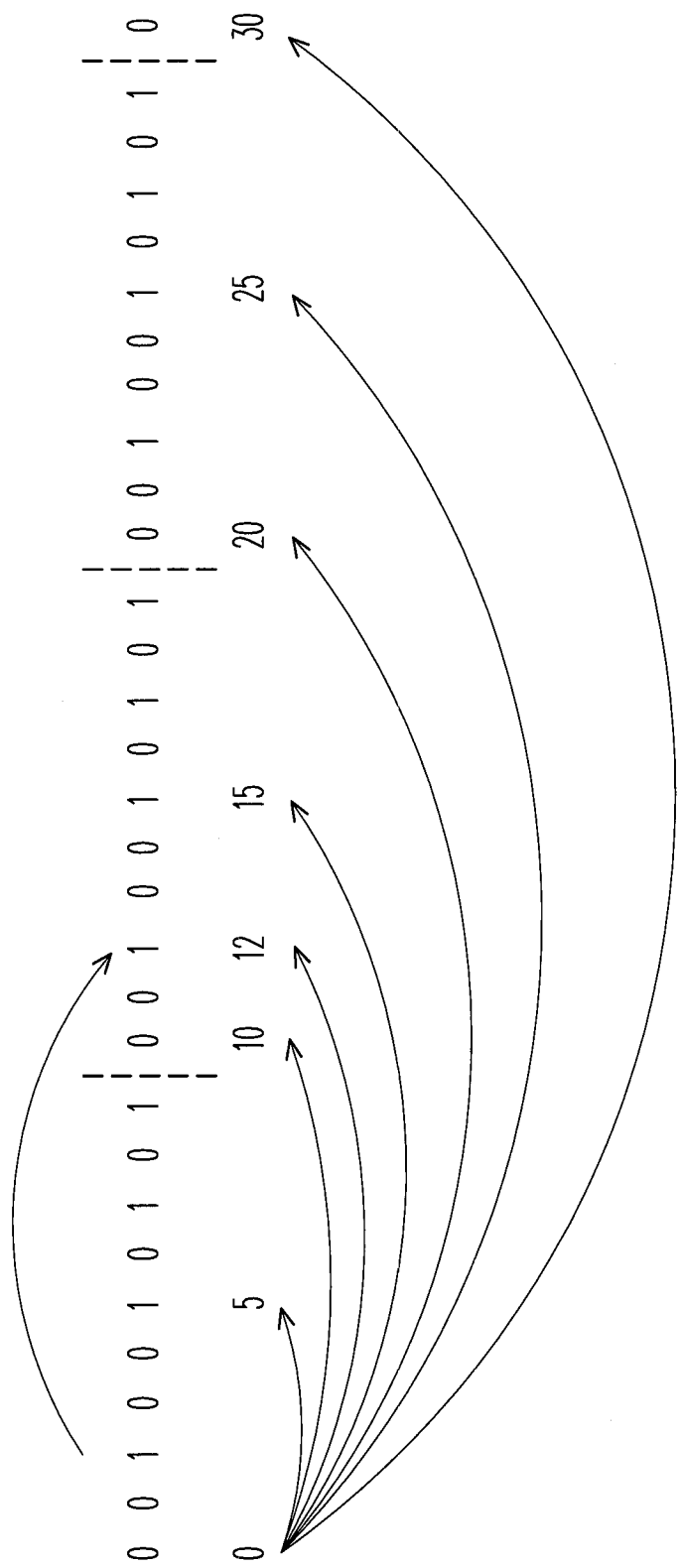
FIG. 5 is a diagram illustrating how a value stream with a predetermined number of bits is analyzed.

FIG. 5 is a diagram illustrating how a value stream with a predetermined number of bits is analyzed. Referring to FIG. 5, in order to effectively detect every possible cycle or cadence pattern, a value stream having a predetermined number of bits is obtained. In the present embodiment, a value stream having 31 bits is obtained and analyzed. When a value stream corresponding to no motion is obtained, several possible cycles or any selected cycle may be detected in the value stream to determine whether or not any cycle exists. The detection cycles may be 5, 10, 12, 15, and 25, etc. However, the invention is not limited thereto. The cadence patterns in the cycles 5, 10, 12, 15, and 25 are corresponding to different splitting mechanism:

cycle 5: (3 2);
cycle 10: (2 2), (2 2 2 4), (2 3 3 2), (5 5), (6 4);
cycle 12: (3 2 3 2 2);
cycle 15: (8 7);
cycle 25: (2 2 2 2 2 2 2 2 2 2 2 3).

Regarding the actual selection of a cycle, the cycle n may be selected from a plurality of factors of 50/60 Hz.

The splitting mechanism illustrated in FIG. 5 may be 3:3: 2:2. According to this splitting mechanism, the first frame among the original frames is split into three even and odd image, the second frame, same as the first frame, is split into three images, the third frame is split into two images, and the fourth frame is also split into two images. The value stream obtained based on the splitting mechanism 2:3:3:2 has a similar cycle pattern 01001001010100100101 as the value stream obtained based on the splitting mechanism 3:3:2:2. The split images retain the even-odd or the odd-even sequence. In the present embodiment, the value 0 of the first bit is taken as a reference. In this case, if cycle 5 is detected, since the value of the 6th bit is 1, it is determined that no cycle 5 exists. If cycle 10 is detected, since the value 0 reappears after every 10 bits, it is determined that cycle 10 exists. If cycle 12 is detected, since the value of the 13th bit is 1, it is determined that no cycle 12 exists. If cycle 15 is detected, since the value of the 16th bit is 1, it is determined that no cycle 15 exists. If cycle 25 is detected, since the value of the 26th bit is 1, it is determined that no cycle 25 exists. Additionally, since cycle 5 is a factor of cycle 10, the detection of cycle 5 can be considered as the detection of cycle 10. The cadence pattern is determined through such a technique, wherein the cycle 10 contains many different splitting mechanisms. However, the correct combination can still be obtained to restore the original frame data according to the cadence pattern of cycle 10.

The value stream is corresponding to the play format of the film. In the present embodiment, the values before and after each value 1 are always 0 in the mechanism for detecting whether or not the field images are a dynamic film.

Figure 6:
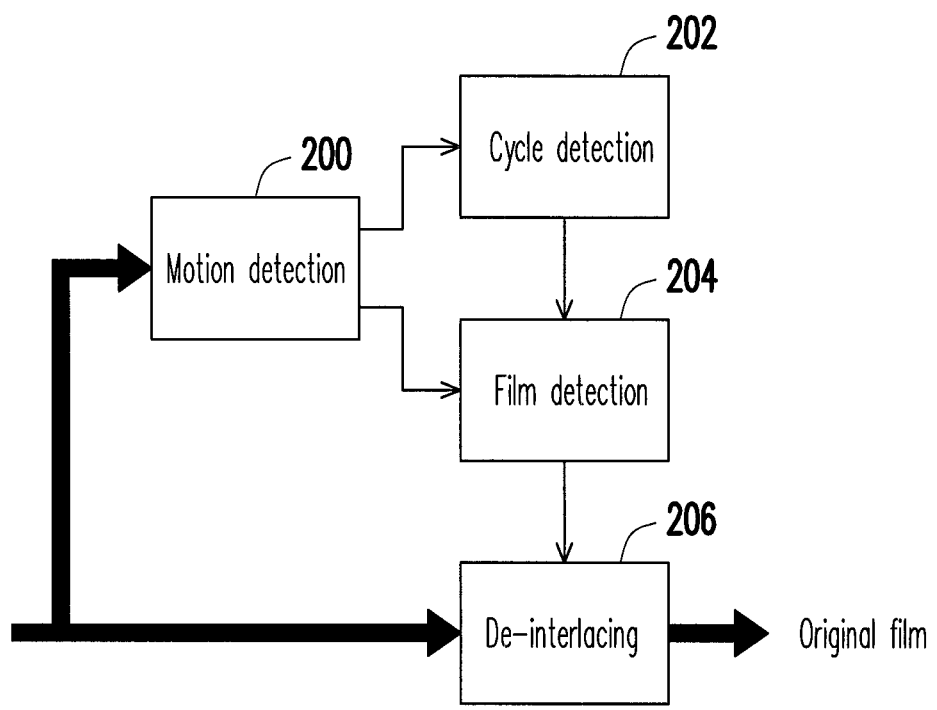
FIG. 6 is a diagram illustrating the structure of a flexible video cadence detecting apparatus according to an embodiment.

The mechanisms and methods described above can be implemented in a flexible video cadence detecting apparatus. FIG. 6 is a diagram illustrating the structure of a flexible video cadence detecting apparatus according to an embodiment. The flexible video cadence detecting apparatus includes a motion detecting unit 200, a cycle detecting unit 202, a film detecting unit 204, and a de-interlacing unit 206. The motion detecting unit 200 receives a plurality of continuous field images and determines whether or not there is motion in each field image. The motion detecting unit 200 assigns a first value (for example, 0) if there is no motion in a field image and assigns a second value (for example, 1) if there is motion in the field image, so that a value stream (for example, a bit stream) is obtained. The cycle detecting unit 202 receives the value stream and detects whether or not the first value or the second value has a cycle, so as to output a cycle determinant. The cycle determinant is not limited to any specific form or information and may be any suitable determinant indicating the existence of a cycle.

Next, the film detecting unit 204 receives the value stream and the cycle determinant and determines whether or not the received field images are in a film format, so as to output a cadence pattern. The de-interlacing unit 206 restores the field images into an original film according to the cadence pattern output by the film detecting unit 204. The de-interlacing unit 206 can determine the technique for splitting original frames into field images and the data that can be substantially restored into original frames according to the cadence pattern.

Moreover, when the motion detecting unit 200 and the de-interlacing unit 206 are in operation, a current field image is processed by referring to one or both of a previous field image and a next field image. However, how a current field image is processed is determined by the adopted motion detection and de-interlacing mechanisms but is not limited to a specific pattern. In embodiments of the invention, a value stream is generated, and a cadence pattern is directly detected from the value stream. Thereby, the cadence pattern of a film can be detected without being limited to a fixed number of cadence patterns.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A flexible video cadence detecting apparatus, comprising:
   a motion detecting unit, receiving a plurality of continuous field images and determining whether or not there is motion in each of the field images, wherein the motion detecting unit assigns a first value when there is no motion in the field image and assigns a second value when there is motion in the field image, so as to obtain a value stream;
   a cycle detecting unit, at a first stage, receiving the value stream and detecting whether or not the first value or the second value has a cycle only from one of a group of candidate cycles, so as to output a cycle determinant;
   a film detecting unit, at a second stage after the first stage, for receiving the value stream and the cycle determinant and determining whether or not the field images are in a film format, so as to output a cadence pattern, wherein one only from a group of a plurality of candidate cadence patterns corresponding to the cycle determinant is determined as the cadence pattern; and
   a de-interlacing unit, for restoring the field images into an original film according to the cadence pattern output by the film detecting unit.

2. The flexible video cadence detecting apparatus according to claim 1, wherein the motion detecting unit determines whether or not there is motion in a current field image by comparing the current field image with a next field image or a previous field image.

3. The flexible video cadence detecting apparatus according to claim 2, wherein the first value and the second value is respectively recorded in one bit to obtain a bit stream having a predetermined number of bits.

4. The flexible video cadence detecting apparatus according to claim 3, wherein the cycle detecting unit detects whether or not a binary value of a selected bit appears after each detection cycle and whether or not a plurality of subsequent bit streams have the same detection cycle, wherein the determined detection cycle is the cycle.

5. The flexible video cadence detecting apparatus according to claim 4, wherein the cycle detecting unit detects a cycle of n bits, wherein n is selected among a plurality of factors of 50/60 Hz.

6. The flexible video cadence detecting apparatus according to claim 4, wherein the film detecting unit obtains the cycle and detects whether or not the two bits before and after the bit having the second value in the bit stream have the first value, so as to determine whether or not the field images are in the film format.

7. The flexible video cadence detecting apparatus according to claim 4, wherein the field images comprise a plurality of even images and a plurality of odd images arranged in a sequence of an interlacing cadence, wherein regarding the original film, image data on even-numbered scan lines is taken to form the corresponding even image, and image data on odd-numbered scan lines is taken to form the corresponding odd image.

8. The flexible video cadence detecting apparatus according to claim 4, wherein the first value is 0, and the second value is 1.

9. A film and interlacing cadence detecting apparatus, comprising:
   a motion detecting unit, receiving a plurality of continuous field images and determining whether or not there is motion in each of the field images, wherein the motion detecting unit assigns a first value when there is no motion in the field image and assigns a second value when there is motion in the field image, so as to obtain a value stream;

a cycle detecting unit, at a first stage, receiving the value stream, detecting whether or not the first value or the second value has a cycle only from one of a group of candidate cycles, and outputting the cycle; and a film detecting unit, at a second stage after the first stage, receiving the value stream, determining whether or not the field images are in a film format according to the cycle, and determining an interlacing cadence according to variations of the first value and the second value in the cycle, wherein one only from a group of a plurality of candidate cadence patterns corresponding to the cycle is determined as the interlacing cadence.

10. The film and interlacing cadence detecting apparatus according to claim 9, wherein the motion detecting unit compares a current field image with a next field image or a previous field image to determine whether or not there is motion in the current field image.

11. The film and interlacing cadence detecting apparatus according to claim 9, wherein the first value and the second value is respectively recorded in one bit to obtain a bit stream having a predetermined number of bits.

12. The film and interlacing cadence detecting apparatus according to claim 11, wherein the cycle detecting unit detects whether or not a binary value of a selected bit appears after each detection cycle and whether or not a plurality of subsequent bit streams have the same detection cycle, wherein the determined detection cycle is the cycle.

13. The film and interlacing cadence detecting apparatus according to claim 12, wherein the cycle detecting unit detects a cycle of n bits, wherein n is selected among a plurality of factors of 50/60 Hz.

14. The film and interlacing cadence detecting apparatus according to claim 12, wherein the film detecting unit obtains the cycle and detects whether or not the two bits before and after the bit having the second value in the bit stream have the first value.

15. The film and interlacing cadence detecting apparatus according to claim 12, wherein the field images comprise a plurality of even images and a plurality of odd images arranged in a sequence of an interlacing cadence, wherein regarding the original film, image data on even-numbered scan lines are taken to form the corresponding even image, and image data on odd-numbered scan lines are taken to form the corresponding odd image.

16. A film and interlacing cadence detecting method, for detecting a plurality of field images continuously input to a detecting apparatus, the film and interlacing cadence detecting method comprising:

determining whether or not there is motion in each of the field images, wherein a first value is assigned when there is no motion in the field image, and a second value is assigned when there is motion in the field image, so as to obtain a value stream;

detecting at a first stage to decide whether or not the first value or the second value has a cycle only from one of a group of candidate cycles in the value stream;

determining whether or not the field images are in a film format according to the value stream; and determining an interlacing cadence at a second stage after the first stage, according to variations of the first value and the second value in the cycle, wherein one only from a group of a plurality of candidate cadence patterns corresponding to the cycle is determined as the interlacing cadence.

17. The film and interlacing cadence detecting method according to claim 16, wherein the field images comprise a plurality of even images and a plurality of odd images arranged in a sequence of an interlacing cadence.

18. The film and interlacing cadence detecting method according to claim 17, wherein a current field image is compared with a next field image or a previous field image to determine whether or not there is motion in the current field image.

19. The film and interlacing cadence detecting method according to claim 18, wherein the first value and the second value is respectively recorded in one bit to obtain a bit stream having a predetermined number of bits.

20. The film and interlacing cadence detecting method according to claim 19, wherein the step of detecting whether or not the first value or the second value has the cycle in the value stream comprises:

selecting a bit to be detected, and using a binary value of the bit as a reference; and detecting whether or not the binary value of the bit appears after each detection cycle and whether or not a plurality of subsequent bit streams have the same detection cycle, wherein the determined detection cycle is the cycle.

* * * * *